United States Patent
Ichikawa

(10) Patent No.: US 8,498,030 B2
(45) Date of Patent: Jul. 30, 2013

(54) IMAGE SCANNING APPARATUS FOR LIGHT INTEGRATING AND PREDICTING SIGNALS

(75) Inventor: Shoji Ichikawa, Tokyo (JP)

(73) Assignee: Canon Components, Inc., Saitama-Ken (JP)

( * ) Notice: Subject to any disclaimer, the term of this patent is extended or adjusted under 35 U.S.C. 154(b) by 1505 days.

(21) Appl. No.: 12/090,459

(22) PCT Filed: Dec. 25, 2006

(86) PCT No.: PCT/JP2006/325743
§ 371 (c)(1),
(2), (4) Date: Apr. 16, 2008

(87) PCT Pub. No.: WO2007/074759
PCT Pub. Date: Jul. 5, 2007

(65) Prior Publication Data
US 2009/0040574 A1 Feb. 12, 2009

(30) Foreign Application Priority Data
Dec. 26, 2005 (JP) .................................. 2005-371220

(51) Int. Cl.
*H04N 1/46* (2006.01)

(52) U.S. Cl.
USPC .......................... 358/509; 358/518; 399/220

(58) Field of Classification Search
None
See application file for complete search history.

(56) References Cited

U.S. PATENT DOCUMENTS

| 4,691,228 | A | | 9/1987 | Nagano | 358/75 |
| 5,965,875 | A | | 10/1999 | Merrill | 250/226 |
| 6,104,510 | A | * | 8/2000 | Hu et al. | 358/509 |
| 6,867,757 | B1 | * | 3/2005 | Nakamura | 345/83 |

(Continued)

FOREIGN PATENT DOCUMENTS

| EP | 169 383 | 6/1985 |
| JP | 05-122455 | 5/1993 |
| JP | 61-53870 | 6/1994 |
| JP | 11-164096 | 6/1999 |

(Continued)

OTHER PUBLICATIONS

PCT Notification of Transmittal of Translation of the International Preliminary Report on Patentability (Chapter I or Chapter II of the Patent Cooperation Treaty) (Form PCT/IB/338), PCT International Report on Patentability (Chapter I of the Patent Cooperation Treaty) (Form PCT/IB/373), and PCT Written Opinion of the International Searching Authority (Form PCT/ISA/237), regarding Int'l. Pat. Appln. No. PCT/JP2006/325743, Jul. 10, 2008.

*Primary Examiner* — Benny Q Tieu
*Assistant Examiner* — Michael Y Tzeng
(74) *Attorney, Agent, or Firm* — Fitzpatrick, Cella, Harper & Scinto

(57) ABSTRACT

An image sensor using three-color, e.g., R, G, and B light-emitting elements assures a period in which all the three colors are turned on and periods in each of which one light-emitting element is turned off during a scan period per pixel, and integrates and measures amounts of light of the respective periods. An amount of light based on the OFF light-emitting element is calculated based on a difference between the amounts of light during the full light-ON period and each light-OFF period to define an amount of light of the light-emitting element, and light intensity information corresponding to each light-emitting element is obtained based on a total amount of light during the entire scan period per pixel, and the amount of light of each light-emitting element.

8 Claims, 11 Drawing Sheets

U.S. PATENT DOCUMENTS

| | | | |
|---|---|---|---|
| 7,646,514 B2 * | 1/2010 | Spears et al. | 358/474 |
| 2004/0212847 A1 * | 10/2004 | Bliley et al. | 358/474 |
| 2005/0052713 A1 * | 3/2005 | Spears et al. | 358/509 |
| 2006/0238830 A1 * | 10/2006 | Dikeman | 358/500 |

FOREIGN PATENT DOCUMENTS

| | | |
|---|---|---|
| JP | 2002-513145 | 5/2002 |
| JP | 2003-032437 | 1/2003 |

\* cited by examiner

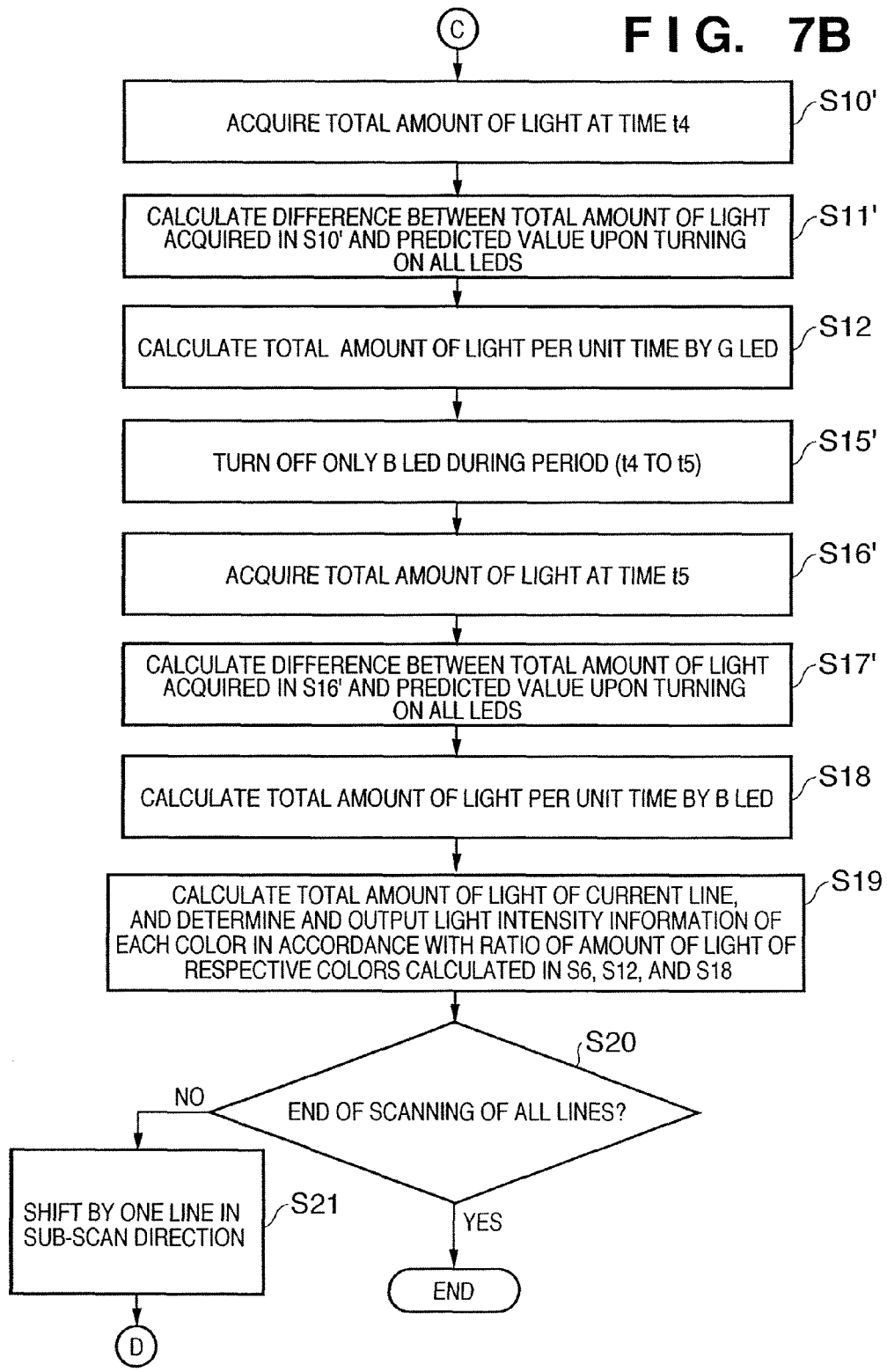

IMAGE SCANNING APPARATUS FOR LIGHT INTEGRATING AND PREDICTING SIGNALS

TECHNICAL FIELD

The present invention relates to a color image sensor unit arranged in an image scanning unit for detecting light reflected from a document surface, an image scanning apparatus using the color image sensor unit, and a control method thereof.

BACKGROUND ART

Conventionally, image scanning apparatuses such as an image scanner, copying machine, and the like use a contact image sensor (to be abbreviated as CIS hereinafter) which scans a document in proximity to it at an equal scale as an image sensor which optically scans image information of a document and converts it into an electrical signal.

FIG. 8 depicts a sectional view showing an example of the arrangement of a conventional color CIS unit.

Light emitted from a light source 71, which is arranged on the end face of a light guide member 72 having a shape elongated in the main scan direction, enters the light guide member 72 and is guided in the longitudinal direction thereof, and almost uniformly illuminates a document 79 placed on a transparent document support table 78 in a line pattern in the main scan direction. This light source 71 comprises light-emitting elements R, G, and B which respectively have three emission colors red, green, and blue (to be abbreviated as R, G, and B hereinafter). In FIG. 8, a frame 73 fixes constituting members such as the light guide member 72, a lens array 74, a sensor board 76, and the like at predetermined positions.

Note that three-color, that is, R, G, and B LEDs are used as these light-emitting elements, which time-divisionally undergo light-ON driving independently of R, G, and B under the control of a light source control circuit (not shown). That is, the light-ON time period of each color LED is ⅓ of one light-ON period. Reflected light from the document 79 illuminated in this way is focused by a lens array 74, and is guided to photoelectric conversion elements 75 arranged on the board 76. An electrical signal photoelectrically converted by the photoelectric conversion elements 75 is externally output via a connector 77. The photoelectric conversion elements 75 as many as the number of pixels to be scanned are arranged along the main scan direction of the document. For example, upon scanning an A4-sized document at 600 dpi, about 5,000 photoelectric conversion elements are arranged.

By contrast, patent reference 1 proposes a method of irradiating with light emitted by LEDs of two colors by turning off an LED of one color of the three color LED light sources. This method is called "complementary color scan", and has an advantage of increasing the amount of irradiated light compared to the prior art. Patent reference 2 describes a technique that adopts a color separation scheme in which three arrays of photoelectric conversion elements are arranged on a sensor IC using a color CIS, and R, G, and B color filters are mounted on respective element arrays. With the technique of patent reference 2, a white light source such as an Xe lamp, white LED, or the like is used as the light source, and that white light source is kept ON. Hence, the light-ON time period of the light source is three times longer than the prior art.

Furthermore, patent reference 3 describes a technique that simultaneously detects signals of R, G, and B, three colors by a single light-receiving unit. A feature of this technique is to exploit entry length differences of light in silicon for color separation. With this technique, a triple well structure is formed in a silicon substrate, and light rays of different colors (400 to 490 nm, 490 to 575 nm, and 575 to 700 nm) are detected by detection units located at different depth positions. As a result, respective pieces of information based on three primary colors (R, G, and B) can be measured at an identical position.

Patent reference 1: Japanese Patent Laid-Open No. 5-122455 (FIG. 2(a))

Patent reference 2: Japanese Patent Laid-Open No. 2003-32437

Patent reference 3: Japanese Patent Laid-Open No. 2002-513145 (U.S. Pat. No. 5,965,875)

DISCLOSURE OF INVENTION

Problems that the Invention is to Solve

With the technique of patent reference 1 described above, a two-dimensional image is scanned by moving a document and a color CIS unit relative to each other. That is, with this prior art, since the R, G, and B LEDs are turned on time-divisionally, the irradiation positions on the relatively moving document are slightly different for respective colors. As a result, color misregistration different from an original image occurs at an image edge and the like. Furthermore, since the light-ON time period of each LED light source is ⅓ of one period, the light intensity with which the document is irradiated becomes short.

With the technique of patent reference 2, each color sensor comprises a color filter, and the white LED light source is kept lighted for a whole time period, and no problem about the irradiation position differences of light sources is posed. In the arrangement of this sensor IC, three, R, G, and B photo-electric conversion element arrays used to detect respective colors are arranged on the sensor IC to have an appropriate spacing. This spacing is set to be an integer multiple of a pixel row interval.

That is, the positions of reflected light received by the R, G, and B photoelectric conversion element arrays have displacements for the spacings between neighboring arrays formed on the IC on the document. Therefore, in order to generate color information by synthesizing R, G, and B outputs from the photoelectric conversion elements of the respective arrays, output line signals from the R, G, and B pixel arrays are temporarily stored in a memory, and are delayed among respective lines among respective colors of image information, thus synthesizing these three colors of image information. This makes it possible to correct the displacements on the document and obtain an output image free from color drift. However, upon arbitrarily changing a resolution, or upon changing the feed speed of a document, correction cannot be made only by this delay correction, and color drift occurs.

With the technique of patent reference 3, since one light-receiving unit simultaneously detects signals of R, G, and B, three colors, color information at the same position can be obtained. However, since color separation is made depending on the depths of light that can penetrate silicon, this technique has a structural defect, that is, incomplete color separation compared to the aforementioned prior arts.

It is an object of the present invention to solve the problems of the prior arts.

A feature of the present invention is to provide an image scanning apparatus and its control method which can obtain image information from an identical scan position on a document and can prolong the light-ON time period of each light-emitting element.

Means of Solving the Problems

In order to achieve the above object, an image scanning apparatus according to one aspect of the present invention comprises the following arrangement. That is, an image scanning apparatus is characterized by comprising:

an illumination unit having at least three light-emitting elements, each having different emission spectra from each other, configured to illuminate a document to be scanned in a linear pattern;

a plurality of photoelectric conversion elements configured to convert light which is emitted by the illumination unit and is reflected by the document into electrical signals;

emission control means for controlling the light-emitting elements to have a full light-ON period in which all the light-emitting elements are turned on and a plurality of light-OFF periods in each of which one of the at least three light-emitting elements is turned off;

light amount integrating means for integrating the electrical signals converted by the photoelectric conversion elements during the full light-ON period and the plurality of light-OFF periods and outputting the integrated electrical signals as light intensity signals; and arithmetic means for calculating light intensity signals of the at least three light-emitting elements based on the light intensity signal during the full light-ON period and the light intensity signals corresponding to the plurality of light-OFF periods, which are output from the light amount integrating means.

In order to achieve the above object, a control method for an image scanning apparatus according to one aspect of the present invention comprises the following steps. That is, a method of controlling an image scanning apparatus, which comprises an illumination unit having at least three light-emitting elements, each having different emission spectra from each other, and illuminates a document to be scanned in a linear pattern, and a plurality of photoelectric conversion elements configured to convert light which is emitted by the illumination unit and is reflected by the document into electrical signals, the method characterized by comprising:

an emission control step of controlling the light-emitting elements to have a full light-ON period in which all the light-emitting elements are turned on and a plurality of light-OFF periods in each of which one of the at least three light-emitting elements is turned off;

a light amount integrating step of integrating the electrical signals converted by the photoelectric conversion elements during the full light-ON period and the plurality of light-OFF periods and outputting the integrated electrical signals as light intensity signals; and an arithmetic step of calculating light intensity signals of the at least three light-emitting elements based on the light intensity signal during the full light-ON period and the light intensity signals corresponding to the plurality of light-OFF periods, which are output in the light amount integrating step.

Effects of the Invention

According to the present invention, since image information can be obtained from a substantially identical position on a document, the light-ON time period of each light-emitting element can be prolonged, the amount of irradiation light on the document can be increased.

Since color information can be scanned at a substantially identical image scan position on a document for each color, color drift can be eliminated.

Other features, aspects and advantages of the present invention will be apparent from the following description when taken in conjunction with the accompanying drawings, in which like reference characters designate the same or similar parts throughout the figures thereof.

BRIEF DESCRIPTION OF DRAWINGS

FIGS. 7A and 7B are flowcharts for explaining scanning processing of one document by a controller 110 of the image scanning apparatus according to the second embodiment;

Figure 1:
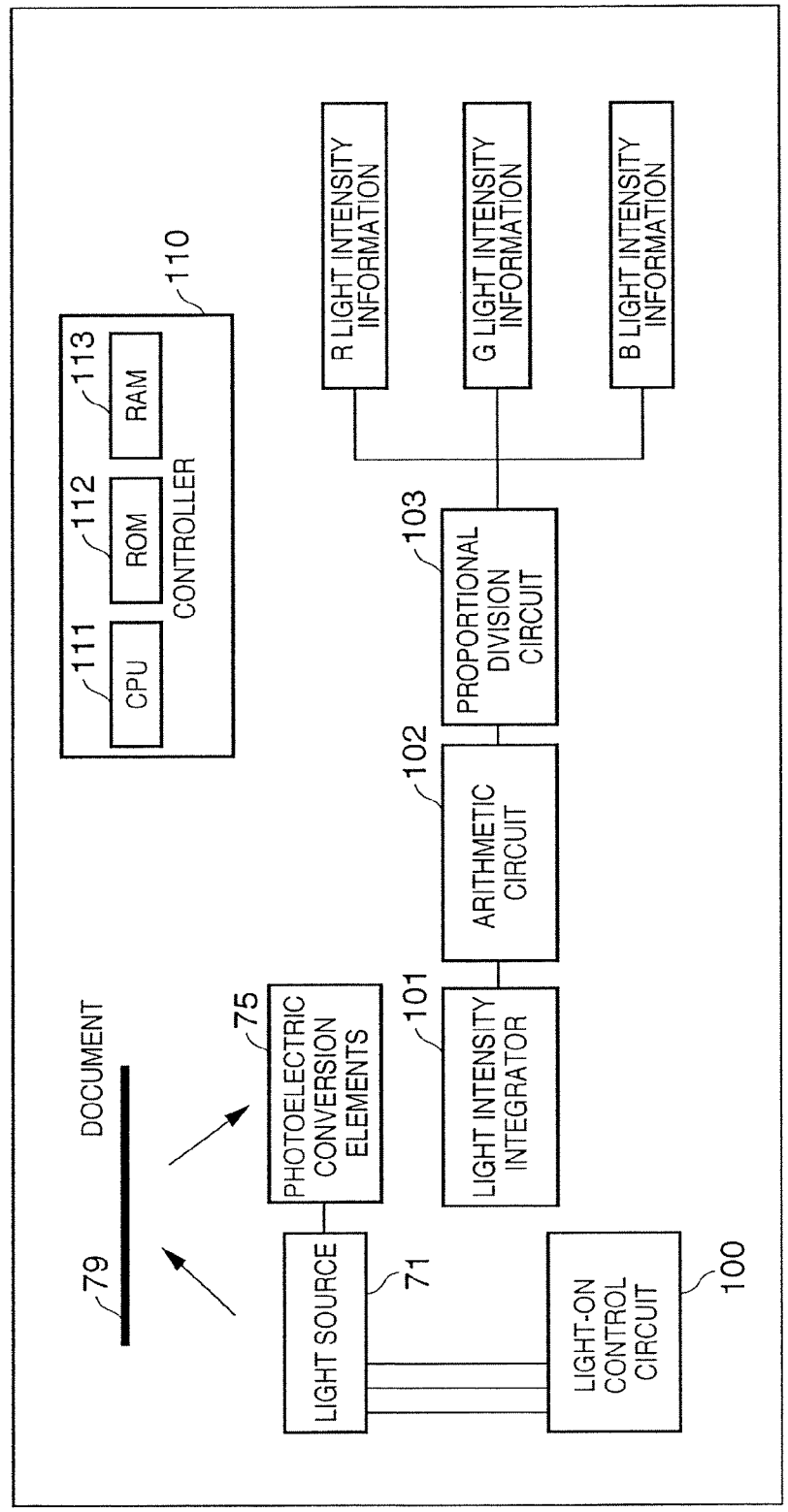
FIG. 1 is a block diagram showing the arrangement of an image scanning apparatus according to an exemplary embodiment of the present invention.

DESCRIPTION OF THE REFERENCE NUMERALS 71 light source
72 light guide member
73 frame
74 lens array
75 photoelectric conversion elements
79 document
100 light-ON control circuit
101 light intensity integrator
102 arithmetic circuit
103 proportional division circuit
110 controller

BEST MODE FOR CARRYING OUT THE INVENTION

The preferred embodiments of the present invention will be described in detail hereinafter with reference to the accompanying drawings. Note that the embodiments to be described hereinafter are not intended to limit the present invention according to the scope of the claims, and all combinations of the features described in the embodiments are not always essential to the solving means of the present invention.

Figure 8:
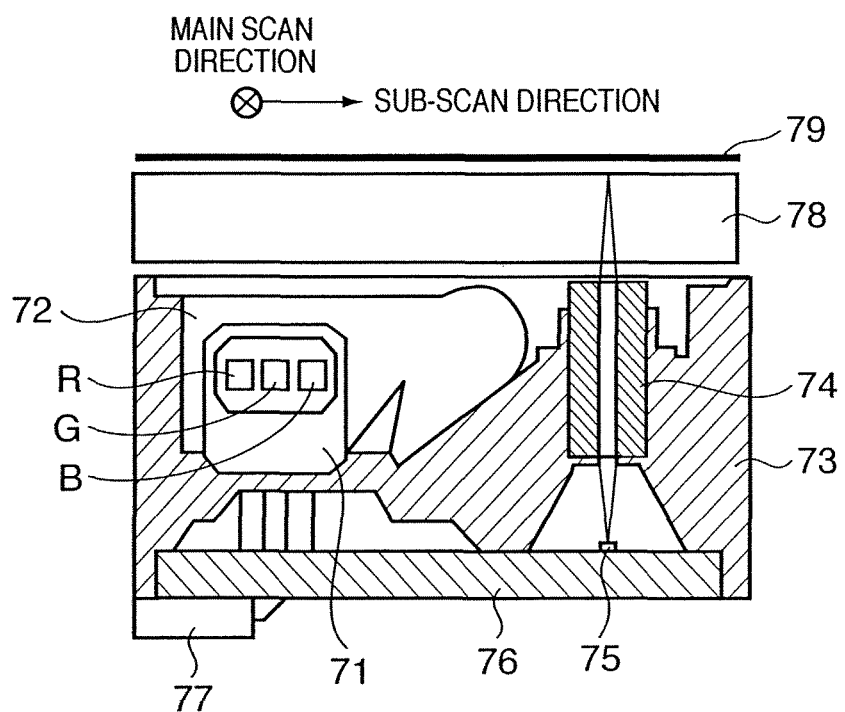
FIG. 8 depicts a sectional view showing an example of the arrangement of a conventional color CIS unit.

This embodiment is characterized in that a light-receiving unit uses the aforementioned color CIS unit shown in FIG. 8, and all three color LEDs are always turned on except for a partial light-OFF period (only one LED is turned off) during an image scan period. Furthermore, this embodiment is characterized in that light obtained by mixing reflected light rays from the three color LEDs is simultaneously received by photoelectric conversion elements to be converted into an electrical signal, and the light intensity of respective colors are calculated based on the degrees of change in light intensity during a light-OFF period of a light source.

FIG. 1 is a block diagram showing the arrangement of an image scanning apparatus according to an exemplary embodiment of the present invention. Note that the same reference numerals in FIG. 1 denote components common to those in FIG. 8.

A light source 71 has R, G, and B, three different LEDs which are the same as those shown in FIG. 8. These R, G, and B LEDs independently undergo light emission driving under different conditions by a light-ON control circuit 100, and a document 79 is illuminated with light coming from these LEDs. Light reflected by this document 79 is guided via a lens array 74 (FIG. 8) to a plurality of photoelectric conversion elements 75. The photoelectric conversion elements 75 are comprised of sensor ICs on which a plurality of sensor elements are arranged linearly, and output electrical signals according to the intensities of the reflected light. The number of photoelectric conversion elements is about 5,000 in an image scanning apparatus which can scan an A4-sized document at a resolution of, for example, 600 dpi. Electrical signals from the respective photoelectric conversion elements 75 are accumulated as light intensity information for respective elements by light intensity integrators 101 provided in correspondence with the photoelectric conversion elements 75. These pieces of accumulated light intensity information are separated into those of individual colors via an arithmetic circuit 102 and proportional division circuit 103.

A controller 110 controls the operations of the aforementioned circuits and the like, and has a CPU 111, a ROM 112 which stores programs and the like to be executed by the CPU 111, and a ROM 113 which provides a work area that stores various data upon processing of the CPU 111. Note that the arithmetic circuit 102 and proportional division circuit 103 may be implemented by programs of the CPU 111 in place of hardware.

Figure 2:
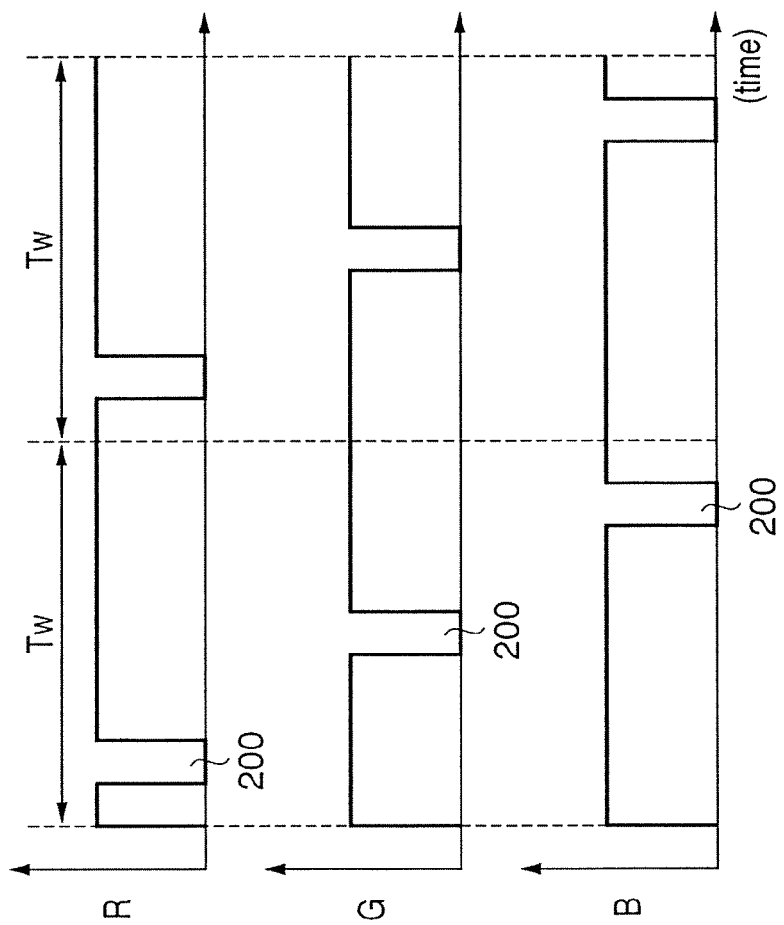
FIG. 2 is a timing chart for explaining the light-ON conditions of light sources (R, G, and B LEDs) in the image scanning apparatus according to the embodiment of the present invention.

FIG. 2 is a timing chart for explaining the light-ON conditions of the light source (R, G, and B LEDs) in the image scanning apparatus according to this embodiment.

Referring to FIG. 2, reference symbol Tw denotes a scan period for one line. In a general scanner or the like, this scan period Tw is set to be a time ranging from 1 to 5 msec. Note that the R, G, and B LEDs undergo light-ON driving control under predetermined light-ON conditions by the light-ON control circuit 100. A characteristic feature lies in that the R, G, and B LEDs undergo light-emission driving control to have light-OFF periods 200 at different timings. A duration of this light-OFF period 200 suffices to be 100 to 500 μsec even in consideration of measurement noise, as long as reflected light rays of other colors can be accurately measured during this period.

Therefore, this light-OFF period 200 is about 1/50 to 1/10 of the scan period Tw for one line. If this light-OFF period becomes long, since the light-ON time period of the light source 71 becomes short, the total light intensity that can be accumulated during the scan period for one line decreases. By contrast, the light source 71 is effectively used with decreasing light-OFF period. However, in a case that this light-OFF period becomes too short, if the amount of reflected light of other ON LEDs is too small, noise components increases, resulting in large measurement errors of the light intensity.

Light, which is emitted by the light source 71 driven by the light-ON control circuit 100 and irradiates the document 79, is reflected by the document 79 to be reflected light. The reflected light reaches the plurality of photoelectric conversion elements 75 via the arrangement shown in FIG. 8, and is photoelectrically converted into electrical signals corresponding to respective pixels. These electrical signals are accumulated by the light intensity integrators 101 provided in correspondence with the photoelectric conversion elements 75 for the scan period Tw for one line.

The scan processing for one color will be explained below for the sake of easy understanding of a description.

Figure 3:
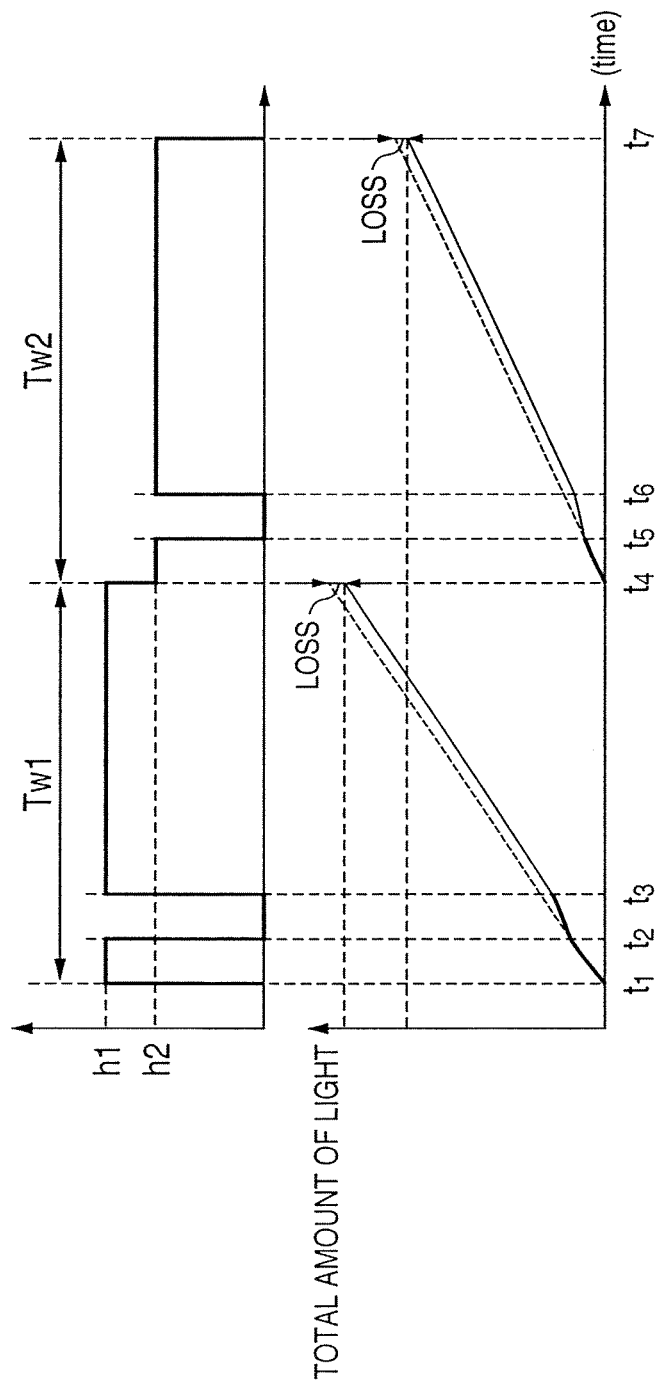
FIG. 3 is a timing chart for explaining a state in which reflected light from a document is photoelectrically converted and is integrated by a light intensity integrator into an electrical signal in the embodiment of the present invention.

FIG. 3 is a timing chart for explaining a state in which reflected light from the document is photoelectrically converted and is integrated by the light intensity integrator 101 to be an integrated electrical signal. In FIG. 3, periods Tw1 and Tw2 respectively represent scan periods for one line (per pixel) per photoelectric conversion element. During the period Tw1, strong reflected light (light beam h1) reaches. During the period Tw2, weak reflected light (light beam h2) reaches.

As described above, electrical signals generated by the photoelectric conversion elements 75 are integrated by the light intensity integrator 101 during this scan period. During a period (t1 to t2) of this scan period Tw1, light with the intensity of the light beam h1 of the reflected light is integrated. During the next period (t2 to t3), one LED (e.g., R LED) is turned off. For this reason, an increment of the electrical signal becomes small during this period. Furthermore, during the next period (t3 to t4), electrical signals corresponding to light with the intensity of the light beam h1 are integrated. In this manner, a light intensity value at the end point t4 of the scan period Tw1 is output as a total light intensity during this scan period Tw1.

Assume that the electrical signal in FIG. 3 is generated based on reflected light coming from, for example, the red (R) LED. In this case, during the period (t1 to t2), the LEDs of other two colors (G and B) are kept ON, as can be seen from FIG. 2. During the period (t2 to t3), only the red LED is turned off, and the remaining LEDs of two colors green and blue (G and B) emit light. That is, a cause for a decrease in increment of the amount of light during this light-OFF period is that this red LED is turned off.

Since the obtained amount of light corresponding to the decrease in increment of the amount of light corresponds to that of the LED which is OFF at that time, the reflected amount of light based on light coming from that LED can be calculated by calculating a loss of the increment of the amount of light.

FIRST EMBODIMENT

Figure 4:
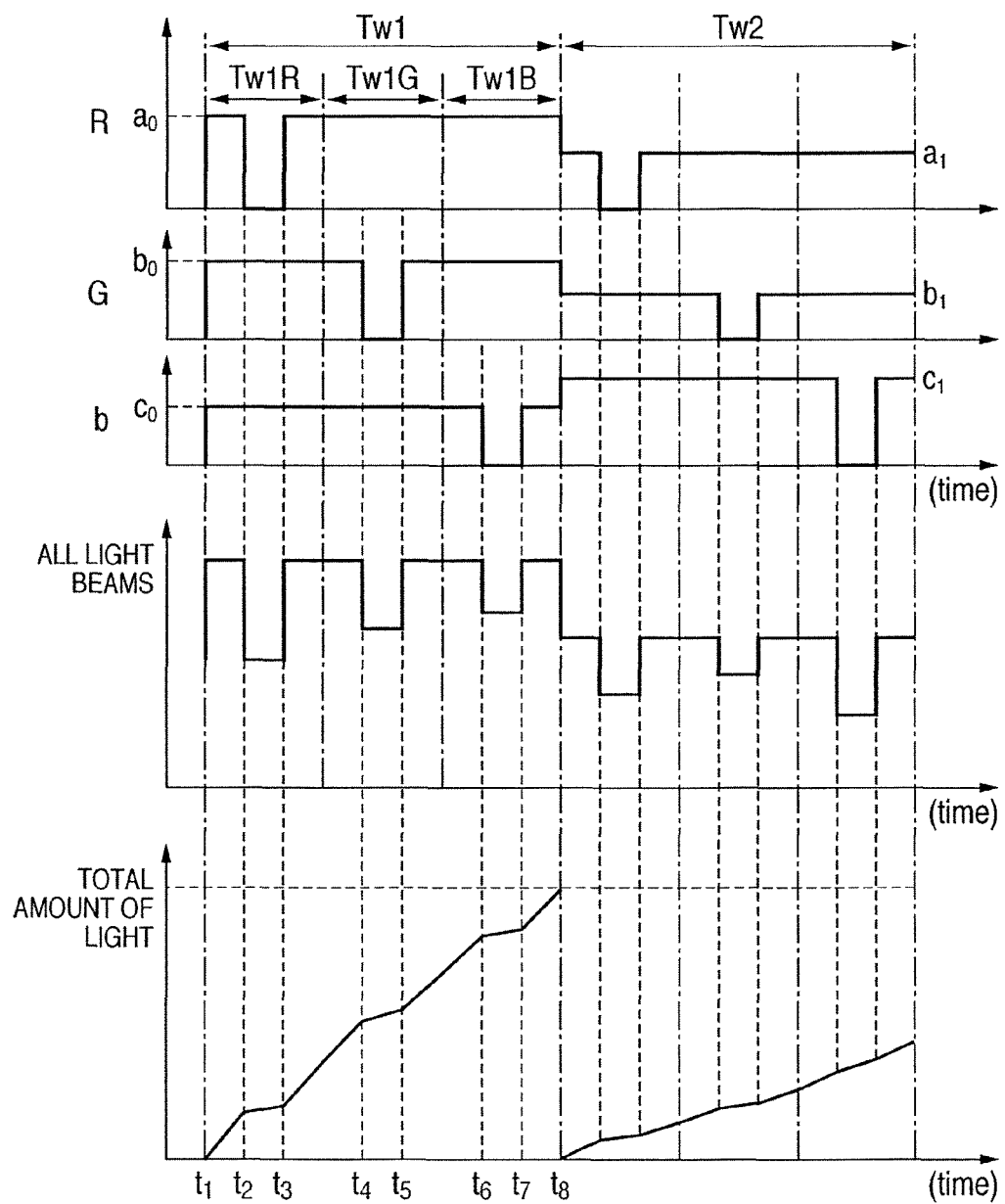
FIG. 4 is a timing chart for explaining image signal processing in the image scanning apparatus according to the embodiment of the present invention.

FIG. 4 is a timing chart for explaining the relationship between the drive timings of respective LEDs in the image scanning apparatus according to the first embodiment, and the amounts of light detected at that time.

Light, which is emitted by RGB LED'S and is reflected by the document, is simultaneously received by the plurality of photoelectric conversion elements 75. The type of color can be discriminated depending on the timing of the light-OFF period, and the reflected light intensity of light coming from the OFF LED can be calculated based on an amount of light loss. Each of the R, G, and B LEDs is turned off during a partial period of the scan period, and the photoelectric conversion elements 75 measure a light intensity signal indicated by "total light beam" in FIG. 4. Furthermore, the light intensity integrators 101 integrate a light beam during the scan period Tw for one line.

In general, it is preferable to set the duration of the scan period Tw1 or Tw2 for one line (per pixel) per photoelectric conversion element to be about 5 msec in consideration of the sensitivity of the existing line sensor. In FIG. 4, the scan period Tw1 is equally divided into three periods Tw1R, Tw1G, and Tw1B. Furthermore, each of these periods Tw1R, Tw1G, and Tw1B is equally divided into three. A light-OFF period of one LED is inserted into each of central periods of these three equally divided periods, that is, a period (t2 to t3), period (t4 to t5), and period (t6 to t7). In this way, the light-OFF period of each LED amounts to ⅑ of the scan period Tw, and is about 550 μsec in this embodiment. Note that the three periods Tw1R, Tw1G, and Tw1B respectively include light-OFF periods of red (R), green (G), and blue (B) LEDs.

The scan period Tw1 will be examined first. Let a0, b0, and c0 be light beams of R, G, and B reflected light rays during this scan period Tw1. During the first full light-ON period (t1 to t2), the total amount of light increases along a line with a slope (a0+b0+c0), and an attained voltage value at time t2 after the end of that period amounts to (a0+b0+c0)×(t2−t1). During the next period (t2 to t3), since only the red LED is turned off, the increment of the total amount of light increases along a line with a slope (b0+c0), and amounts to (b0+c0)×(t3−t2). Furthermore, during the next full light-ON period (t3 to t4), the total amount of light increases along a line with the slope (a0+b0+c0), and the increment during this period amounts to (a0+b0+c0)×(t4−t3).

If the red LED is not turned off at time t3, the total amount of light should be (a0+b0+c0)×(t3−t1). However, in practice, since the red LED is turned off, the total amount of light at time t3 is (a0+b0+c0)×(t2−t1)+(b0+c0)×(t3−t2). Assuming that times (t1 to t3) have the same time interval (T), their difference is given by:

$$2T(a0+b0+c0) - \{T(a0+b0+c0) + T(b0+c0)\} =$$
$$T(a0+b0+c0) - T(b0+c0) = T(a0)$$

Assuming that, for example, the voltage value corresponding to the total amount of light at time t2 is 0.1 [V], the voltage value corresponding to the total amount of light at next time t3 should be 0.2 [V]. However, assume that the voltage value corresponding to the total amount of light at time t3 becomes 0.15 [V], since the red LED is turned off during the period (t2 to t3), as described above. In this case, this difference value 0.2−0.15=0.05 [V] corresponds to the total amount of light of the reflected light coming from the red LED during this period (t2 to t3).

In this way, since the loss of the increment of the total amount of light at time t3 is calculated, the total amount of light of the reflected light coming from the red LED during the period T can be calculated.

Likewise, the total amount of light of the reflected light during the period T based on each of the remaining green and blue LEDs can be calculated.

The same applies to the scan period Tw2. That is, let a1, b1, and c1 be the amounts of light of the R, G, and B reflected light rays during this scan period Tw2. Even in this case, the total amounts of light from the LED of each color during the period T can be calculated.

A more practical explanation will be given below.

Figure 5A:
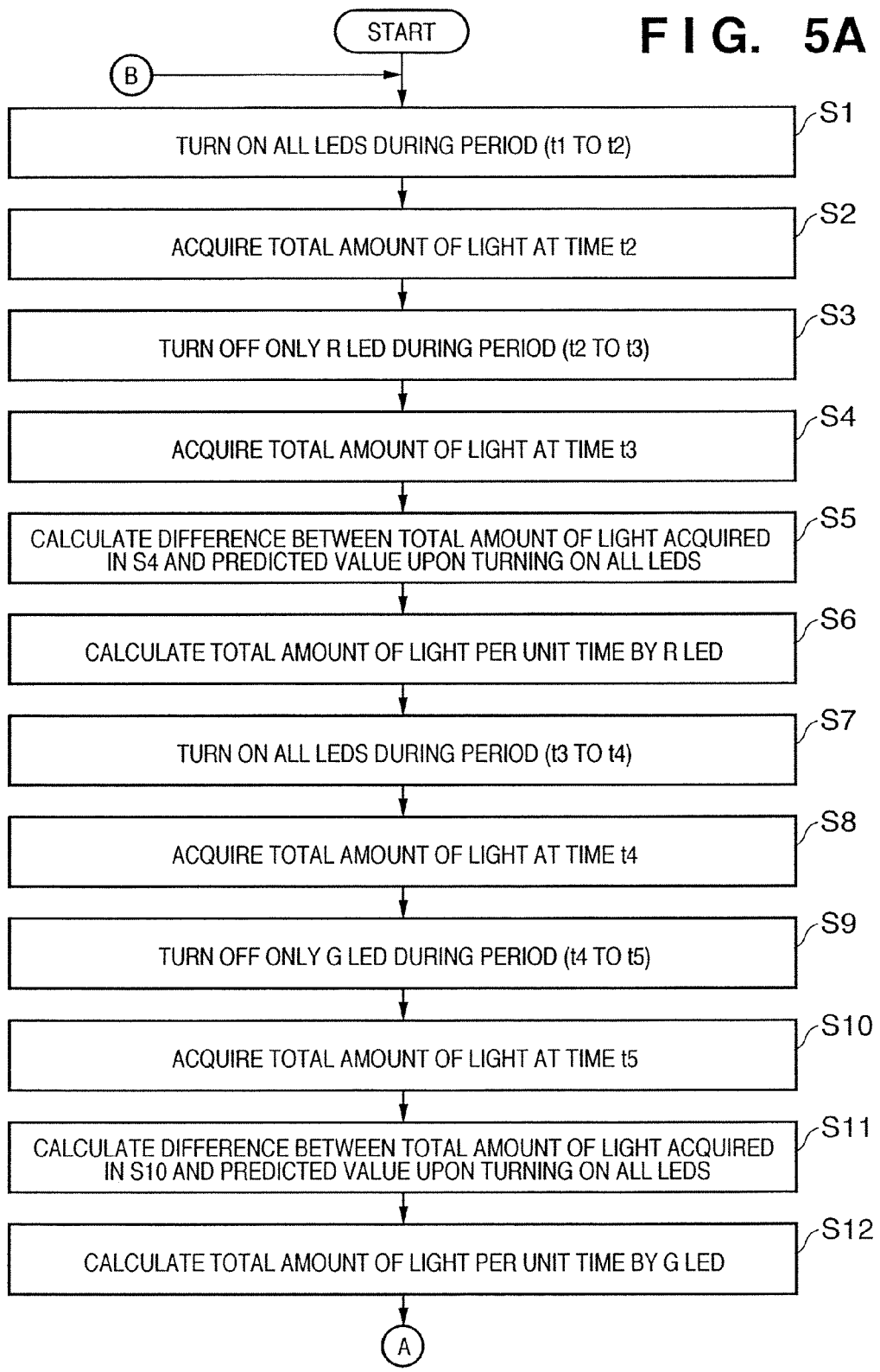
FIGS. 5A and 5B are flowcharts for explaining scanning processing of one document by a controller of the image scanning apparatus according to a first embodiment.
Figure 5B:
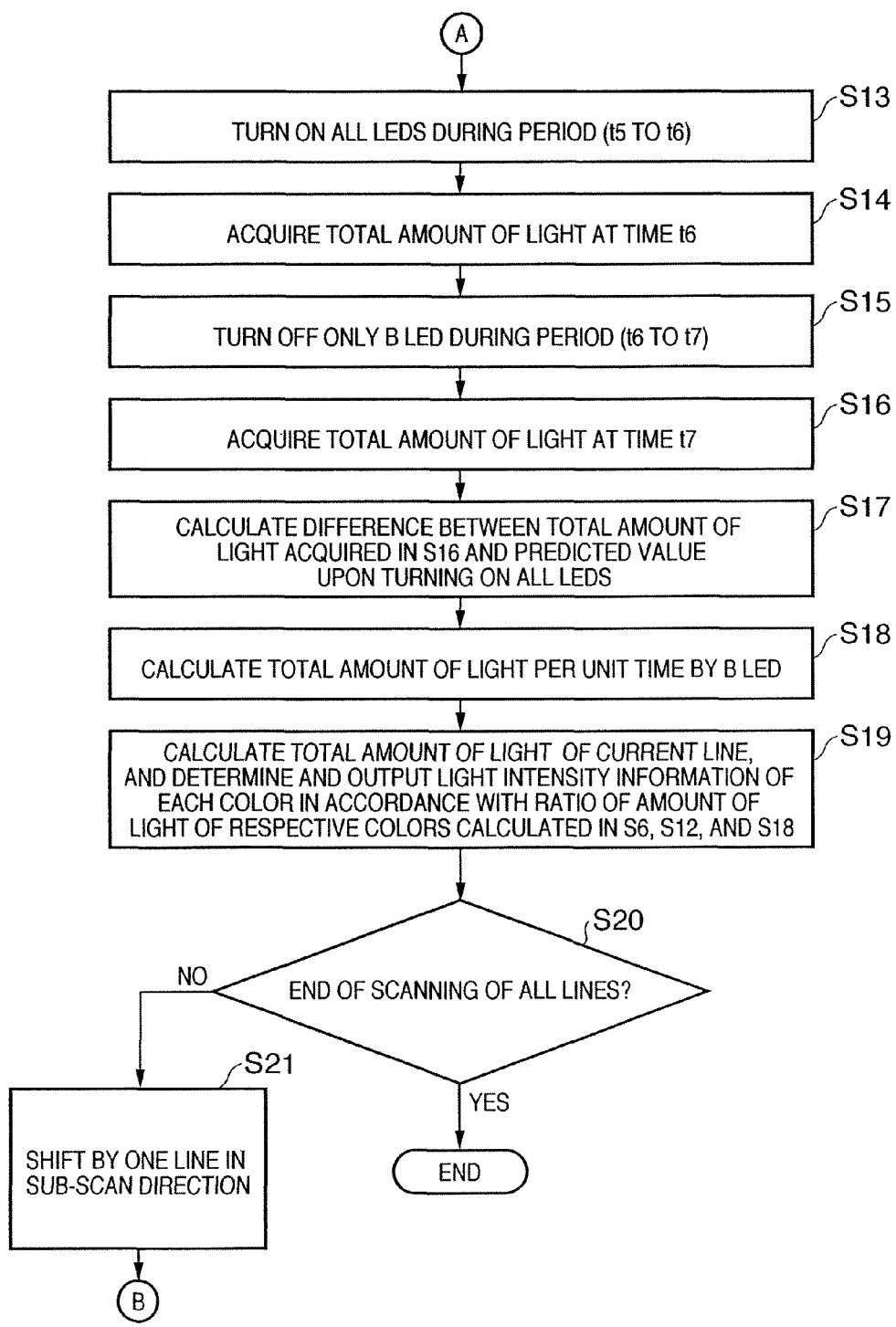

FIGS. 5A and 5B are flowcharts for explaining the scan processing of one document by the controller 110 of the image scanning apparatus according to the first embodiment. Note that a program for implementing this processing is stored in the ROM 112, and is executed under the control of the CPU 111. This processing will be described with reference to FIG. 4 described above.

In step S1, the CPU 111 turns on all the R, G, and B LEDs to irradiate a document with light during the first period (t1 to t2) obtained by equally dividing the scan period Tw for one line (per pixel) into nine. In step S2, the CPU 111 acquires a total amount of light obtained by the light intensity integrators 101 at time t2. In step S3, the CPU 111 turns off only the R LED and irradiates the document with light coming from the remaining G and B LEDs during the period (t2 to t3). In step S4, the CPU 111 acquires a total amount of light obtained by the light intensity integrators 101 at time t3. The process advances to step S5 to calculate the difference between the total amount of light obtained in step S4 and a predicted amount of light value obtained upon turning on all the LEDs during the period (t2 to t3). The process advances to step S6. In step S6, since the difference calculated in step S5 is a value obtained since only the R LED was turned off during the period (t2 to t3) in step S3, the CPU 111 divides the difference by the duration of the period (t2 to t3) to calculate a total amount of light per unit time by the R LED.

The same applies to the G LED. That is, in step S7 the CPU 111 turns on all the R, G, and B LEDs to irradiate the document with light during the next period (t3 to t4). In step S8, the CPU 111 acquires a total amount of light obtained by the light intensity integrators 101 at time t4. In step S9, the CPU 111 turns off only the G LED and irradiates the document with light coming from the remaining R and B LEDs during the period (t4 to t5). In step S10, the CPU 111 acquires a total amount of light obtained by the light intensity integrators 101 at time t5. The process advances to step S11 to calculate the difference between the total amount of light obtained in step S10 and a predicted amount of light value obtained upon turning on all the LEDs during the period (t4 to t5). The process advances to step S12. In step S12, since the difference calculated in step S11 is a value obtained since only the G LED was turned off during the period (t4 to t5) in step S9, the CPU 111 divides the difference by the duration of the period (t4 to t5) to calculate a total amount of light per unit time by the G LED.

The same applies to the B LED. That is, in step S13 the CPU 111 turns on all the R, G, and B LEDs to irradiate the document with light during the next period (t5 to t6). In step S14, the CPU 111 acquires a total amount of light obtained by the light intensity integrators 101 at time t6. In step S15, the CPU 111 turns off only the B LED and irradiates the document with light coming from the remaining R and G LEDs during the period (t6 to t7). In step S16, the CPU 111 acquires a total amount of light obtained by the light intensity integrators 101 at time t6. The process advances to step S17 to calculate the difference between the total amount of light obtained in step S16 and a predicted amount of light value obtained upon turning on all the LEDs during the period (t6 to t7). The process advances to step S18. In step S18, since the difference calculated in step S17 is a value obtained since only the B LED was turned off during the period (t6 to t7) in step S15, the CPU 111 divides the difference by the duration of the period (t6 to t7) to calculate a total amount of light per unit time by the B LED.

After the pieces of light intensity information of R, G, and B are obtained, the process advances to step S19, and the CPU 111 calculates a total amount of light finally accumulated during the scan period Tw based on that at the scan end time (t8) for one line. The CPU 111 then proportionally divides this total amount of light at a ratio based on the aforementioned total amounts of light of respective colors to calculate light intensity information of each color. The CPU 111 then outputs the pieces of light intensity information of R, G, and B for one line, which are obtained in this way. The CPU 111 determines in step S20 whether or not scanning of all lines of the document is complete. If it is determined that the scanning of all lines of the document is complete, the CPU 111 terminates this scanning processing. If the scanning of all lines of the document is not complete yet, the process advances to step S21 to shift the scan position of the scanner by one line in the sub-scan direction. The process then returns to step S1 to repeat the aforementioned processes.

As described above, according to the first embodiment, since the reflected light intensities of light rays coming from the LEDs of respective colors are accumulated even during the light-OFF period of one LED, the noise level can be lowered.

The first embodiment is characterized in that the full light-ON period is assured. During this full light-ON period, all pieces of color information are measured at the identical position. The full light-ON period is relatively long in the scan period for one line (per pixel), and the light-OFF period of one LED required to scan individual color information is distributed between neighboring full light-ON periods. In this way, the color drift of the scanned image can be greatly eliminated compared to the prior arts. In this embodiment, since the light-OFF timings of the respective LEDs are different from each other, if a document is scanned while it moves at high speed in the sub-scan direction, the scan positions of respective colors may be slightly different in the sub-scan direction. However, in this embodiment, the simultaneous light-ON period of three colors is greatly longer than each individual light-OFF period during the scan period per pixel, and the light intensity signal of each color is obtained based on the reflected light intensity during the full light-ON period and that during the light-OFF period of each color. In this manner, the displacement of the document scan position due to the light-OFF timing differences of the LEDs can be suppressed. Hence, according to this embodiment, three color information can be obtained from substantially the same position on the document.

SECOND EMBODIMENT

Figure 6:
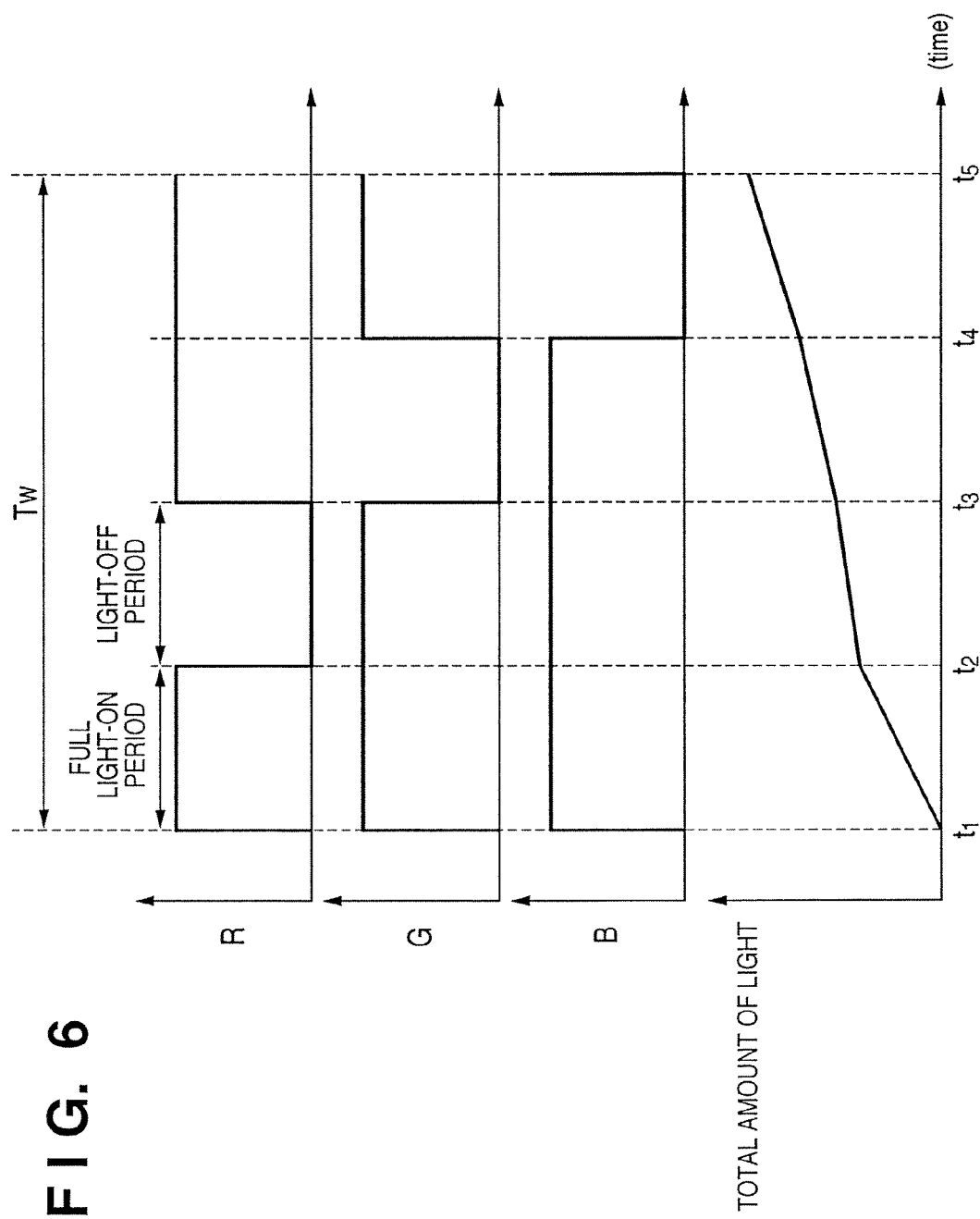
FIG. 6 is a timing chart for explaining a second embodiment of the present invention.

FIG. 6 is a timing chart for explaining the second embodiment of the present invention. A characteristic feature of the second embodiment lies in that the light-OFF time periods of the LEDs of respective colors R, G, and B are sequentially switched.

A full light-ON period for turning on all the LEDs is allocated at the head of the scan period Tw for one line (per pixel), and light-OFF periods of the respective LEDs are successively allocated. In FIG. 6, all the LEDs are ON during the full light-ON period (t1 to t2). During a period (t2 to t3) having the same duration, only the red LED is turned off. Also, during the next period (t3 to t4) having the same duration, only the green LED is turned off. Furthermore, during a period (t4 to t5) having the same duration, only the blue LED is turned off.

In this embodiment, the integrated light intensity at respective times during the scan period Tw (times t1 to t5) are calculated, and a change in the amount of light per unit time is then calculated. The difference between the amount of light of the full light-ON period and the increment of the amount of light of each light-OFF period indicates the amount of light corresponding to the color of the OFF LED.

Figure 7A:
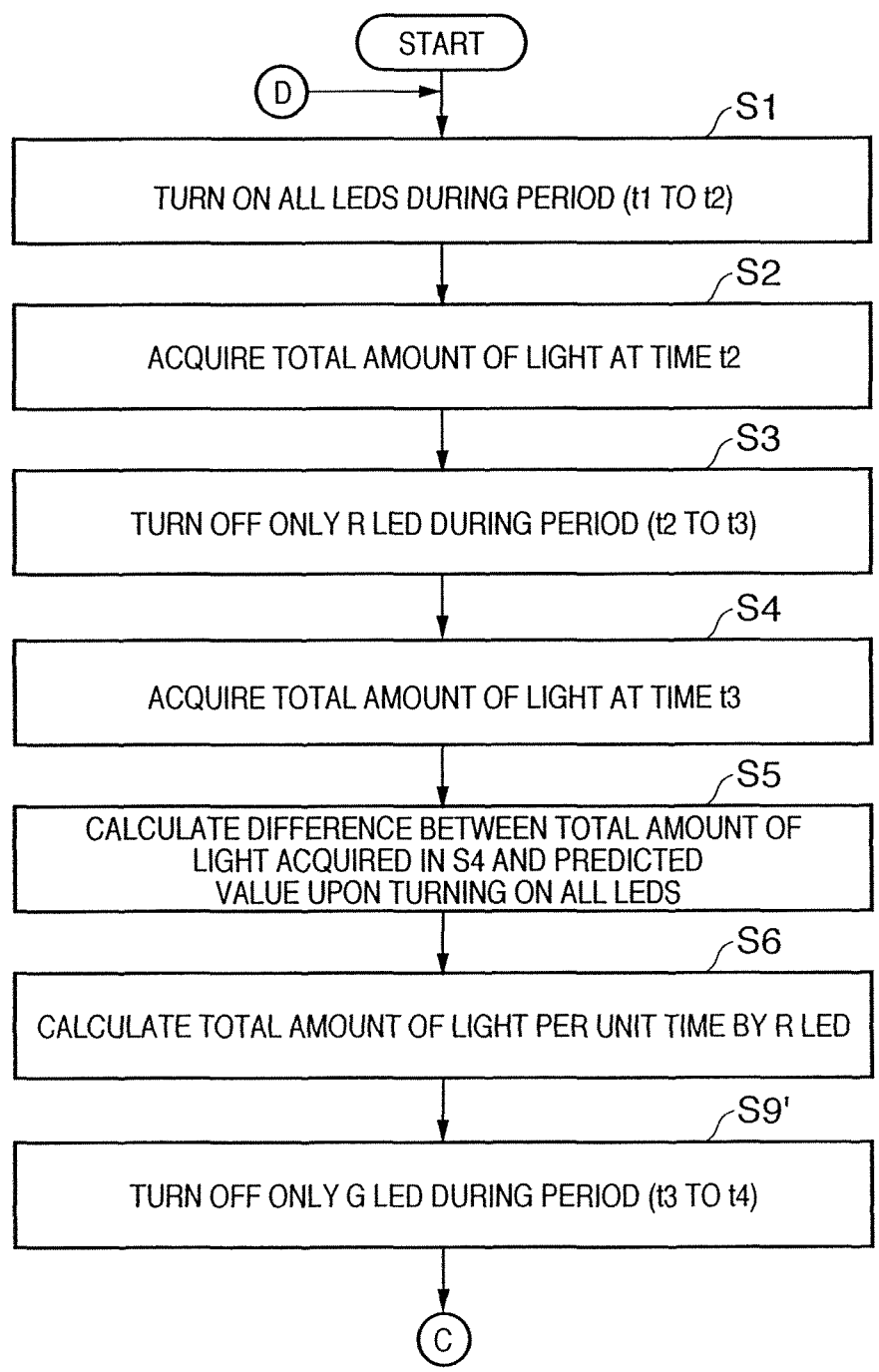

FIGS. 7A and 7B are flowcharts for explaining the scan processing of one document by the controller 110 of the image scanning apparatus according to the second embodiment. Note that a program for implementing this processing is stored in the ROM 112, and is executed under the control of the CPU 111. This processing will be described with reference to FIG. 6 described above. Note that the same step numbers in the flowcharts of FIGS. 7A and 7B denote the steps common to those in FIGS. 5A and 5B.

Since steps S1 to S6 are the same as those in FIG. 5A described above, a repetitive description thereof will be avoided. Step S9' is basically the same as step S9 in FIG. 5A except for the light-OFF period (t3 to t4) of the G LED, and steps S10' and S11' are also basically the same as steps S10 and S11 in FIG. 5A, except for time t4. Furthermore, steps S15' to S17' are basically the same as steps S15 to S17 in FIG. 5B, except for the light-OFF period of the B LED and the period for acquiring the total amount of light. Moreover, steps S18 to S21 are the same as those in FIG. 5B. More specifically, in step S19 the CPU 111 calculates a total amount of light accumulated during the scan period Tw based on that at the scan end time (t8) for one line. The CPU 111 then proportionally divides this total amount of light at a ratio based on the aforementioned total amounts of light of respective colors to calculate light intensity information of each color. The CPU 111 then outputs the pieces of light intensity information of R, G, and B for one line, which are obtained in this way. The CPU 111 determines in step S20 whether or not scanning of all lines of the document is complete. If scanning of all lines of the document is complete, the CPU 111 terminates this scanning processing. If scanning of all lines of the document is not complete yet, the process advances to step S21 to shift the scan position of the scanner by one line in the sub-scan direction. The process then returns to step S1 to repeat the aforementioned processes.

As described above, according to the second embodiment, the number of processing steps can be reduced, as can be seen from comparison with the aforementioned flowcharts of FIGS. 5A and 5B.

In this manner, a characteristic feature of the second embodiment lies in that the number of measurement points of the amounts of light during the scan period Tw for one line (per pixel) is halved compared to the aforementioned first embodiment (FIG. 4). As a result, the processing of the arithmetic circuit becomes very simple. Also, the light-ON period of the LED of each color becomes ¾ of the scan period Tw. For this reason, each LED can be kept ON for a greatly longer period, while the ratio of the light-emission time period of the prior art is ⅓ of the scan period Tw for one line.

Furthermore, in the prior art, since the LED of one color emits light time-divisionally, a problem of the displacement on the relatively moving document is posed. By contrast, in the second embodiment, all the pieces of color information can be simultaneously scanned at least during the full light-ON period, and the reflected light information of the LEDs of two colors can also be obtained during the light-OFF period. Therefore, the influence of the displacement can be eliminated compared to the aforementioned prior art.

Note that in the second embodiment, the duration of the light-ON period of all the LEDs is equal to the light-OFF period of only one LED. However, the present invention is not limited to this. For example, by setting the light-ON period of all the LEDs to be longer than the light-OFF period of only one LED, the problem of color drift can be eliminated.

THIRD EMBODIMENT

As the third embodiment of the present invention, an embodiment in which the image sensor unit according to the aforementioned first and second embodiments is used in a flatbed scanner as an image scanning apparatus will be described below.

Figure 9:
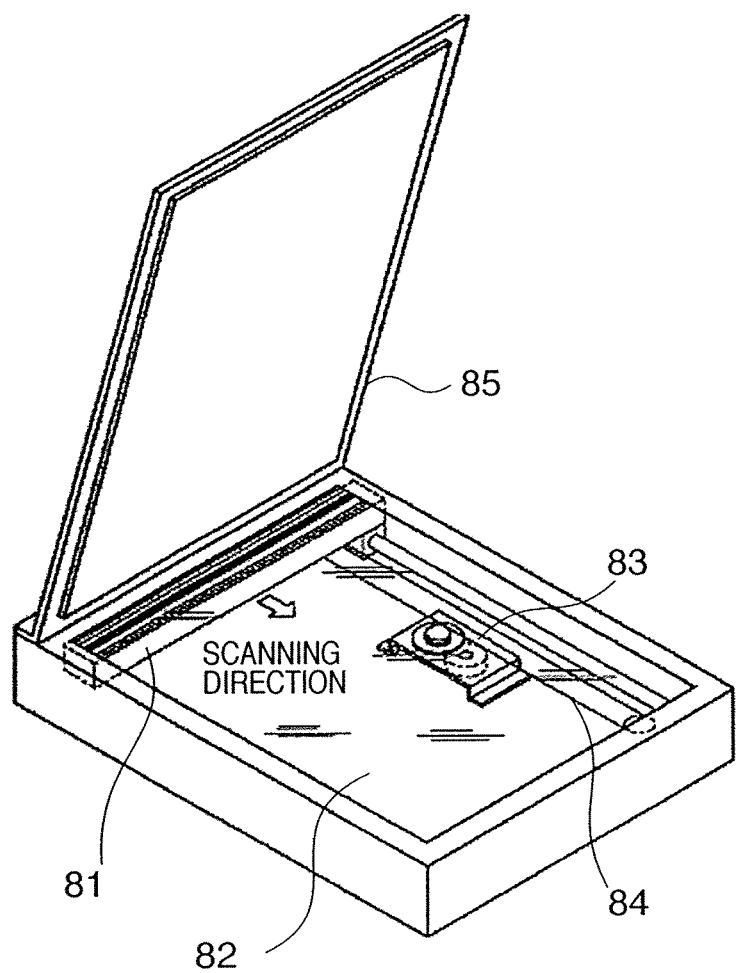
FIG. 9 depicts a perspective view showing the outer appearance of an image scanner according to the third embodiment.

FIG. 9 depicts a perspective view showing the outer appearance of an image scanner according to the third embodiment.

Referring to FIG. 9, reference numeral 81 denotes a CIS unit according to this embodiment. Reference numeral 83 denotes a drive motor which moves the image sensor unit with respect to a document support member on which a document is placed; numeral 84 denotes a wire; numeral 82 denotes a glass plate as the document support member; and numeral 85 denotes a document pressure plate.

By mechanically moving the wire 84 by driving the drive motor 83, the CIS unit 81 moves in a scanning direction (sub-scan direction) and can scan an image of a document. The CIS unit 81 is constructed as a sensor unit in which an illumination unit is integrally built in. Reflected light from a document illuminated by this illumination unit is focused on photoelectric conversion elements 75 (FIG. 8) by a lens array (not shown) of the CIS unit 81, and is output as image information for each line. In this way, a sheet-like document can be scanned, and its image signal can be output.

Light intensity information output from the photoelectric conversion elements is converted into digital information by an analog/digital converter (A/D converter), and is reconstructed as image information by a digital signal processing circuit (not shown) after it is linked with information of the measurement position.

The image scanner which mounts the CIS unit according to this embodiment can implement an image scanner which is unsusceptible to the color drift and the like against a change in resolution or a change in scan speed, and can stably scan image information.

INDUSTRIAL APPLICABILITY

Since the present invention can obtain image information at the identical position on a document, the scanning precision can be improved, and the present invention can be used in a high-resolution image scanning apparatus. Since the light-ON period of the light-emitting elements (LEDs) is long, the irradiation light intensity can increase, and the scan time period of a document can be shortened. As a result, the present invention can also be used in a high-speed image scanning apparatus.

The present invention is not limited to the above embodiments and various changes and modifications can be made within the spirit and scope of the present invention. Therefore to apprise the public of the scope of the present invention, the following claims are attached.

This application claims the benefit of Japanese Patent Application No. 2005-371220 filed on Dec. 26, 2005, which is hereby incorporated by reference herein in its entirety.

The invention claimed is:

1. An image scanning apparatus comprising:
    an illumination unit having three light-emitting elements, each having different emission spectra from each other, configured to illuminate a document to be scanned in a linear pattern;
    a plurality of photoelectric conversion elements that convert light which is emitted by the illumination unit and is reflected by the document into electrical signals;
    an emission control unit that controls the light-emitting elements to have plural full light-ON periods in each of which all three light-emitting elements are turned on and three light-OFF periods in each of which a respective one of each of the three light-emitting elements is turned off, in a scan period;
    a light amount integrating unit that integrates the electrical signals converted by the photoelectric conversion elements during the plural full light-ON periods and three light-OFF periods each of which a respective one of each of the three light-emitting elements is turned off and outputs the integrated electrical signal as a light intensity of the scan period;
    a prediction unit that predicts an electrical signal corresponding to an amount of light value to be converted by the photoelectric conversion elements during all the light-emitting elements are turned on in the scan period, based on the electrical signals integrated by the light amount integrating unit during the plural full light-ON periods; and
    an arithmetic unit that calculates a difference between the integrated electrical signal integrated by the light amount integrating unit and the predicted electrical signal predicted by the prediction unit in the scan period and calculates a light intensity signal of each of the three light-emitting elements based on the difference in the scan period.

2. The apparatus according to claim 1, further comprising:
    a unit that calculates a total amount of light obtained by integrating the electrical signals obtained by the photoelectric conversion elements during the scan period by the light amount integrating unit; and
    a proportional division unit that calculates light intensity information corresponding to each light-emitting element based on the total amount of light and the light intensity signals of the three light-emitting elements calculated by the arithmetic unit.

3. The apparatus according to claim 1, wherein the emission control unit alternately allocates each of the plural full light-ON periods and each of the three light-OFF periods during the scan period.

4. The apparatus according to claim 1, wherein the emission control unit turns off each of the three light-emitting elements once in the scan period.

5. A method of controlling an image scanning apparatus, which comprises an illumination unit having three light-emitting elements, each having different emission spectra from each other, and illuminates a document to be scanned in a linear pattern, and a plurality of photoelectric conversion elements configured to convert light which is emitted by the illumination unit and is reflected by the document into electrical signals, the method comprising:
    an emission control step of controlling the light-emitting elements to have a plural full light-ON periods in each of which all three light-emitting elements are turned on and three light-OFF periods in each of which a respective one of each of the three light-emitting elements is turned off, in a scan period;
    a light amount integrating step of integrating the electrical signals converted by the photoelectric conversion elements during the plural full light-ON and the three light-OFF periods each of which a respective one of each of the three light-emitting elements is turned off and outputting the integrated electrical signal as a light intensity of the scan period;
    a prediction step of predicting an electrical signal corresponding to an amount of light value to be converted by the photoelectric conversion elements during all three light-emitting elements are turned on in the scan period, based on the electrical signals integrated during the plural full light-ON periods; and an arithmetic step of calculating a difference between the integrated electrical signal integrated in the light amount integrating step and the predicted electrical signal predicted in the prediction step in the scan period and calculating a light intensity signal of the three light-emitting elements based on the difference in the scan period.

6. The method according to claim 5, further comprising:

a step of calculating a total amount of light obtained by integrating the electrical signals obtained by the photoelectric conversion elements during the scan period in the light amount integrating step; and a proportional division step of calculating light intensity information corresponding to each light-emitting element based on the total amount of light and the light intensity signals of the three light-emitting elements calculated in the arithmetic step.

7. The method according to claim 5, wherein in the emission control step, each of the plural full light-ON periods and each of the three light-OFF periods are alternately allocated during the scan period.

8. The method according to claim 5, wherein in the emission control step, each of the three light-emitting elements is once turned off in the scan period.

* * * * *